(12) United States Patent
Song et al.

(10) Patent No.: US 11,594,731 B2
(45) Date of Patent: Feb. 28, 2023

(54) ANODE ACTIVE MATERIAL FOR LITHIUM SECONDARY BATTERY AND LITHIUM SECONDARY BATTERY COMPRISING SAME

(71) Applicant: SAMSUNG SDI CO., LTD., Yongin-si (KR)

(72) Inventors: Suho Song, Yongin-si (KR); Sangbok Kim, Yongin-si (KR); Joongho Moon, Yongin-si (KR); Junghwan Park, Yongin-si (KR); Kisoo Lee, Yongin-si (KR); Joohan Song, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 195 days.

(21) Appl. No.: 16/758,509

(22) PCT Filed: Oct. 16, 2018

(86) PCT No.: PCT/KR2018/012156
§ 371 (c)(1),
(2) Date: Apr. 23, 2020

(87) PCT Pub. No.: WO2019/088503
PCT Pub. Date: May 9, 2019

(65) Prior Publication Data
US 2020/0251736 A1    Aug. 6, 2020

(30) Foreign Application Priority Data

Nov. 6, 2017  (KR) .................. 10-2017-0146932

(51) Int. Cl.
*H01M 4/587*    (2010.01)
*H01M 4/36*    (2006.01)
(Continued)

(52) U.S. Cl.
CPC .......... *H01M 4/587* (2013.01); *H01M 4/364* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2004/0023115 A1    2/2004  Kato et al.
2012/0064403 A1    3/2012  Kameda et al.
(Continued)

FOREIGN PATENT DOCUMENTS

CN    102523761 A    6/2012
CN    102637859 A    8/2012
(Continued)

OTHER PUBLICATIONS

Japanese Office action dated May 25, 2021.
(Continued)

*Primary Examiner* — Wyatt P McConnell
(74) *Attorney, Agent, or Firm* — Lee IP Law, P.C.

(57) ABSTRACT

The present invention relates to an anode active material for lithium secondary battery and a lithium secondary battery comprising the same. The anode active material for lithium secondary batteries comprises two kinds of crystalline carbon, with the peak intensity ratio of 3R(101) face to 2H(100) face $I_{3R(101)}/I_{2H(100)}$ ranging from 0.55 to 0.7 in an X-ray diffraction pattern.

7 Claims, 5 Drawing Sheets

(51) Int. Cl.
    *H01M 10/0525*     (2010.01)
    *H01M 4/02*     (2006.01)

(56) References Cited

U.S. PATENT DOCUMENTS

| | | |
|---|---|---|
| 2012/0070733 A1 | 3/2012 | Yamada et al. |
| 2012/0148922 A1 | 6/2012 | Takahashi |
| 2012/0183865 A1 | 7/2012 | Deguchi |
| 2013/0143127 A1 | 6/2013 | Nakamura et al. |
| 2016/0181612 A1 | 6/2016 | Lee et al. |
| 2016/0276657 A1 | 9/2016 | Song et al. |
| 2016/0372751 A1 | 12/2016 | Lee et al. |
| 2017/0062822 A1* | 3/2017 | Hwang ................ H01M 4/587 |

FOREIGN PATENT DOCUMENTS

| | | |
|---|---|---|
| JP | 2010-219036 A | 9/2010 |
| JP | 2010-251314 A | 11/2010 |
| JP | 2011-138680 A | 7/2011 |
| KR | 10-2004-0012541 A | 2/2004 |
| KR | 10-2012-0035213 A | 4/2012 |
| KR | 10-2013-0101002 A | 9/2013 |
| KR | 10-2015-0073107 A | 6/2015 |
| KR | 10-2016-0014539 A | 2/2016 |
| KR | 10-2016-0149762 A | 12/2016 |
| KR | 10-2017-0025136 A | 3/2017 |
| WO | WO 2012-015054 A1 | 2/2012 |

OTHER PUBLICATIONS

Extended European Search Report dated Jul. 15, 2021.
Chinese Office action dated Nov. 12, 2021.
International Search Report dated Mar. 13, 2019 for PCT/KR2018/012156.
Korean Office action dated Apr. 26, 2022.
Chinese Office action and Search Report dated May 25, 2022.
Korean Notice of Allowance dated Jul. 14, 2022.
Chinese Office action dated Sep. 9, 2022.
Chinese Office action dated Dec. 28, 2022.

* cited by examiner

ANODE ACTIVE MATERIAL FOR LITHIUM SECONDARY BATTERY AND LITHIUM SECONDARY BATTERY COMPRISING SAME

CROSS REFERENCE TO RELATED APPLICATIONS

This is the U.S. national phase application based on PCT Application No. PCT/KR2018/012156, filed Oct. 16, 2018, which is based on Korean Patent Application No. 10-2017-0146932, filed Nov. 6, 2017, the entire contents of all of which are hereby incorporated by reference.

TECHNICAL FIELD

This relates to an anode active material for a lithium secondary battery and a lithium secondary battery including the same.

BACKGROUND ART

A low voltage system (LVS) is a system having a higher voltage than conventional vehicles, by additionally equipping a lead acid battery with the lithium ion battery or exchanging a lead acid battery with a lithium ion battery.

When the LVS is used, the battery voltage may be increased up to 48 V, compared to the lead acid battery voltage of the conventional vehicle of mostly 12 V. However, this battery voltage is still lower than greater than or equal to 60 V of a lead acid battery for an electric vehicle (EV), and this is why it is called a low voltage system. As such a LVS requires rapid charge and discharge characteristics (high power) and the charge characteristics of the battery depends on the chargeability of an anode, an anode with high power has been required.

DISCLOSURE

Technical Problem

An embodiment provides an anode active material for a lithium secondary battery exhibiting good initial efficiency and charge and discharge characteristics.

Another embodiment provides a lithium secondary battery including an anode active material.

Technical Solution

One embodiment provides an anode active material for a lithium secondary battery including two kinds of crystalline carbon and having a ratio ($I_{3R(101)}/I_{2H(100)}$) of peak intensity at a 3R(101) face relative to a peak intensity at a 2H(100) face ranging from 0.55 to 0.7, in an X-ray diffraction pattern.

The two kinds of crystalline carbon may be a first graphite and a second graphite. The first graphite may be natural graphite, and the second graphite may be artificial graphite.

A mixing ratio of the first graphite and the second graphite may be 20:80 to 40:60 by weight.

The first graphite may have an interlayer spacing d(002) of 3.354 Å≤d(002)≤3.359 Å.

The second graphite may be an interlayer spacing d(002) of 3.360 Å<d(002)<3.364 Å.

The ratio ($I_{3R(101)}/I_{2H(100)}$) of peak intensity at a 3R(101) face relative to a peak intensity at a 2H(100) face may be 0.55 to 0.65, or more than 0.55 and 0.65 or less.

Another embodiment of the present invention provides a lithium secondary battery including an anode including: an anode active material; a cathode including a cathode active material; and an electrolyte.

Other embodiments of the present invention are included in the following detailed description.

Advantageous Effects

An anode active material for a lithium secondary battery according to one embodiment may provide a lithium secondary battery exhibiting good initial efficiency and charge and discharge characteristics.

MODE FOR INVENTION

Hereinafter, embodiments of the present invention are described in detail. However, these embodiments are exemplary, the present invention is not limited thereto, and the present invention is defined by the scope of claims.

The anode active material for a lithium secondary battery according to one embodiment of the present invention includes two kinds of crystalline carbon, and has a ratio ($I_{3R(101)}/I_{2H(100)}$) of peak intensity at a 3R(101) face relative to peak intensity at a 2H(100) face ranging from 0.55 to 0.7, in an X-ray diffraction pattern. In one embodiment, the ratio ($I_{3R(101)}/I_{2H(100)}$) of peak intensity at a 3R(101) face relative to peak intensity at a 2H(100) face may be 0.55 to 0.65, and may be more than 0.55 and 0.65 or less.

If the ratio ($I_{3R(101)}/I_{2H(100)}$) of peak intensity at a 3R(101) face relative to peak intensity at a 2H(100) face is less than 0.55, or more than 0.7, it is not desirable because the charge and discharge characteristics are deteriorated. In particular, it is more preferred that the ratio ($I_{3R(101)}/I_{2H(100)}$) of peak intensity at a 3R(101) face relative to peak intensity at a 2H(100) face of the anode active material is more than 0.55 (not including 0.55) and 0.65 or less, which gives more improved charge and discharge characteristics.

Generally, graphite is classified into a rhombohedral structure and a hexagonal structure having a stacking sequence of an ABAB type according to order of stacking of a graphene layer, and R in 3R(101) denotes a rhombohedral structure while H denotes a hexagonal structure in 2H(100).

In general, the peak intensity may indicate the height of a peak or an integral area of the peak which is obtained from integrating the area of peak, and the peak intensity according to one embodiment may indicate the height of the peak. In one embodiment, the peak intensity of 3R(101) in an X-ray diffraction pattern indicates a highest height value of peaks showing in the range of 42.8<2θ<43.8 and the peak intensity of 2H(100) in an X-ray diffraction pattern, indicates a highest height value of peaks showing at the range of 41.8<2θ<42.8.

In one embodiment, the X-ray diffraction pattern, that is, a measurement of XRD may be measured by using a CuKα ray as a target ray, and the measurement condition is 2θ=40° to 50°, scan speed (°/S) of 0.0056 to 0.0112, and step size (°/step) of 0.0066 to 0.0131.

The two kinds of crystalline carbon may be crystalline carbons having different particle diameters from each other; secondary particle crystalline carbon and primary particle crystalline carbon; or natural graphite and artificial graphite. According to one embodiment, two kinds of crystalline carbon may be a first graphite and a second graphite, and the first graphite may be natural graphite while the second graphite may be artificial graphite. The mixing ratio of the first graphite and the second graphite may be 20:80 to 40:60 by weight. If the first graphite and the second graphite are out of the range, that is, the weight ratio of the first graphite is less than 20, it is not desirable because the charge and discharge rate characteristics and the initial efficiency are decreased, and the low-temperature resistance is increased. Otherwise, if the weight ratio of the first graphite is more than 40, it is not desirable because the discharge capacity is reduced.

The first graphite may have an interlayer spacing d(002) of 3.354 Å≤d 002≤3.359 Å, and according to one embodiment, the first graphite may be a natural graphite having the above interlayer spacing.

In the case of using a natural graphite without the above properties as the natural graphite, even if it is mixed with an artificial graphite, an anode active material having the desired peak intensity of the XRD cannot be obtained, so that excellent initial efficiency, and charge and discharge characteristics cannot be obtained.

As the second graphite, graphite having an interlayer spacing d(002) of 3.360 Å<d 002<3.364 Å may be used, and according to one embodiment, the second graphite may be artificial graphite having the above interlayer spacing.

Another embodiment of the present invention provides a lithium secondary battery including an anode including an anode active material, a cathode including a cathode active material, and an electrolyte. The lithium secondary battery according to one embodiment may be for a low voltage system (LSV), and may be a lithium secondary battery with an operation voltage of 2.1 V to 48 V.

The anode includes an anode active material layer and an anode current collector supported on the anode active material layer.

In the anode active material layer, the anode active material may be included in an amount of 95 wt % to 99 wt % based on the total weight of the anode active material layer.

In one embodiment of the present invention, the anode active material layer may include an anode active material and a binder, and may optionally further include a conductive material. In the anode active material layer, an amount of the binder may be 1 wt % to 5 wt % based on a total weight of the anode active material layer. Furthermore, when the conductive material is further included, 90 wt % to 98 wt % of the anode active material, 1 wt % to 5 wt % of the binder, and 1 wt % to 5 wt % of the conductive material may be used.

The binder acts to adhere anode active material particles to each other and to adhere the anode active material to the current collector. The binder may be a non-water-soluble binder, a water-soluble binder, or a combination thereof.

The non-water-soluble binder may be polyvinyl chloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber (SBR), an acrylonitrile-butadiene rubber, an acrylic rubber, a butyl rubber, polypropylene, an ethylene propylene copolymer, polyepichlorohydrin, polyphosphazene, polyacrylonitrile, polystyrene, an ethylene propylene diene copolymer, polyvinyl pyridine, chlorosulfonated polyethylene, latex, a polyester resin, an acrylic resin, a phenolic resin, an epoxy resin, polyvinyl alcohol, or a combination thereof.

When the aqueous binder is used as the binder for the negative electrode, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metal may be Na, K, or Li. Such a thickener may be included in an amount of 0.1 parts by weight to 3 parts by weight based on 100 parts by weight of the negative active material.

The conductive material is included to provide electrode conductivity, and any electrically conductive material may be used as a conductive material unless it causes a chemical change. Examples of the conductive material include: a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The positive electrode may include a positive current collector and a positive active material layer formed on the positive current collector. The positive active material may include lithiated intercalation compounds that reversibly intercalate and deintercalate lithium ions. Specifically, it may include one or more composite oxides of a metal selected from cobalt, manganese, nickel, and a combination thereof, and lithium.

More specific examples may be compounds represented by one of the following chemical formulae. $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0≤b≤0.5, 0≤c≤0.05); $Li_aE_{2-b}X_bO_{4-c}D_c$ (0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2PO_{43}$ ($0 \leq f \leq 2$); $Li_{(3-f)}Fe_2PO_{43}$ ($0 \leq f \leq 2$); or $Li_aFePO_4$ ($0.90 \leq a \leq 1.8$)

In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material (for example, any coating method such as spray coating, dipping, and the like) by using these elements in the compound, but is not illustrated in more detail since it is well-known in the related field.

According to one embodiment, the cathode active material may be at least two nickel-based cathode active materials such as $Li_aNi_{1-b-c}Co_bX_cD_\alpha$ ($0.90 \leq a \leq 0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$), or a mixture of the nickel-based cathode active material and another active material of the above cathode active material except for the nickel-based cathode active material.

In particular, the nickel-based cathode active material may desirably be $Li_aNi_{b1}Co_{c1}X_{d1}G_{z1}O_2$ ($0.90 \leq a \leq 0.5 \leq b1 \leq 0.98$, $0 \leq c1 \leq 0.3$, $0 < d1 \leq 0.3$, $0 \leq z1 \leq 0.1$, $b1+c1+d1+z1=1$, X is Mn, Al, or a combination thereof, and, G is Cr, Fe, Mg, La, Ce, Sr, V or a combination thereof).

If they are mixed to use, the mixing ratio may be suitably controlled according to the desired physical properties. For example, if the mixture of the nickel-based cathode active material with another active material is used, the amount of the nickel-based cathode active material may be 30 wt % to 97 wt % based on the total weight of the cathode active material.

In the cathode, an amount of cathode active material may be 90 wt % to 98 wt % based on the total weight of the cathode active material layer.

In an embodiment of the present disclosure, the cathode active material layer may further include a binder and a conductive material. Herein, each amount of the binder and the conductive material may be 1 wt % to 5 wt %, respectively, based on a total amount of the cathode active material layer.

The binder improves binding properties of cathode active material particles with one another and with a current collector. Examples of the binder may be polyvinyl alcohol, carboxymethyl cellulose, hydroxypropyl cellulose, diacetyl cellulose, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity, and any electrically conductive material may be used as a conductive material unless it causes a chemical change in a battery. Examples of the conductive material include: a carbon-based material such as natural graphite, artificial graphite, carbon black, acetylene black, ketjen black, a carbon fiber and the like; a metal-based material of a metal powder or a metal fiber including copper, nickel, aluminum, silver, and the like; a conductive polymer such as a polyphenylene derivative; or a mixture thereof.

The current collector may use Al, but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. Furthermore, the ketone-based solvent includes cyclohexanone and the like. In addition, the alcohol-based solvent include ethyl alcohol, isopropyl alcohol, and the like, and examples of the aprotic solvent include nitriles such as R—CN (where R is a C2 to C20 linear, branched, or cyclic hydrocarbon group, a double bond, may be include an aromatic ring, or an ether bond), amides such as dimethylformamide, dioxolanes such as 1,3-dioxolane, sulfolanes, and the like The organic solvent may be used alone or in a mixture, and when the organic solvent is used in a mixture, the mixture ratio may be controlled in accordance with a desirable battery performance, which may be understood by a person having ordinary skill in this art.

The carbonate-based solvent is prepared by mixing a cyclic carbonate and a chain carbonate. When the cyclic carbonate and the chain carbonate are mixed together in a volume ratio of 1:1 to 1:9, electrolyte performance may be improved.

When the non-aqueous organic solvents are used in a mixture, a mixed solvent of a cyclic carbonate and a chain carbonate; a mixed solvent of a cyclic carbonate and a propionate-based solvent; or a mixed solvent of cyclic carbonate, chain carbonate, and a propionate-based solvent may be used. The propionate-based solvent may be methyl propionate, ethyl propionate, propyl propionate, or a combination thereof.

Herein, the cyclic carbonate and the chain carbonate, or the cyclic carbonate and the propionate-based solvent, may be mixed in a volume ratio of 1:1 to 1:9 to exhibit good electrolyte performances. Furthermore, the cyclic carbonate, the chain carbonate and the propionate-based solvent may be mixed in a volume ratio of 1:1:1 to 3:3:4. Also, the mixing ratio of the solvents may be suitably controlled according to the desired physical properties.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 1.

[Chemical Formula 1]

In Chemical Formula 1, $R_1$ to $R_6$ are the same or different, and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula 2 as an additive for improving the cycle-life of a battery.

[Chemical Formula 2]

In Chemical Formula 2, $R_7$ and $R_8$ are the same or different, and are selected from hydrogen, a halogen, a cyano group (CN), a nitro group ($NO_2$), and a fluorinated C1 to C5 alkyl group, provided that at least one of $R_7$ and $R_8$ is a halogen, a cyano group (CN), a nitro group ($NO_2$), or a fluorinated C1 to C5 alkyl group and both of $R_7$ and $R_8$ are not hydrogen.

Examples of the ethylene carbonate-based compound may be difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving the cycle-life may be used within an appropriate range.

The lithium salt dissolved in the organic solvent supplies lithium ions in a battery, enables a basic operation of a rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example, an integer ranging from 1 to 20), LiCl, LiI and $LiB(C_2O_4)_2$ (lithium bis(oxalato) borate; LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a type of the battery. Examples of a suitable separator material include polyethylene, polypropylene, polyvinylidene fluoride, and multi-layers thereof having two or more layers and may be a mixed multilayer such as a polyethylene/polypropylene double-layered separator, a polyethylene/polypropylene/polyethylene triple-layered separator, and a polypropylene/polyethylene/polypropylene triple-layered separator.

Figure 1:
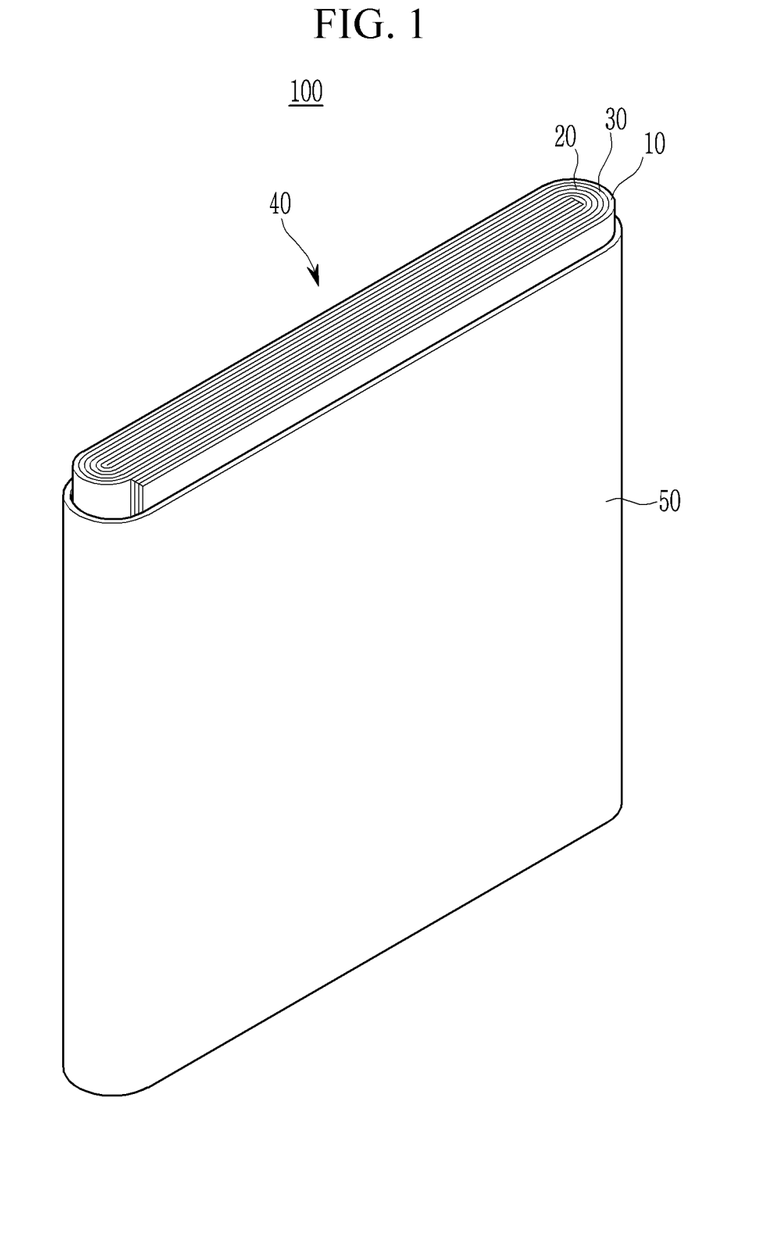
FIG. 1 is a schematic view showing a structure of a lithium secondary battery according to an embodiment of the present invention.

FIG. 1 is an exploded perspective view showing a rechargeable lithium battery according to an embodiment. The rechargeable lithium battery according to an embodiment is illustrated as a prismatic battery, but is not limited thereto and may include variously-shaped batteries such as a cylindrical battery, a pouch battery, and the like.

Referring to FIG. 1, a rechargeable lithium battery 100 according to an embodiment includes an electrode assembly 40 manufactured by winding a separator 30 disposed between a positive electrode 10 and a negative electrode 20, and a case 50 housing the electrode assembly 40. An electrolyte (not shown) may be impregnated in the positive electrode 10, the negative electrode 20, and the separator 30.

EXAMPLES FOR PERFORMING INVENTION

Hereinafter, examples of the present invention and comparative examples are described. These examples, however, are not in any sense to be interpreted as limiting the scope of the invention.

Example 1

Artificial graphite (Tradename: CP7M, Manufacturer: Shanshan Technology) at 80 wt % and natural graphite (Tradename: HC37, Manufacturer: Hitachi, Ltd.) at 20 wt % were mixed to prepare an anode active material.

The interlayer spacing d(002) of the natural graphite was measured and the results were 3.359 Å.

The negative active material at 94 wt %, polyvinylidene fluoride at 3 wt % and ketjen black at 3 wt % were mixed in N-methyl pyrrolidne to prepare an anode active material slurry composition. The anode active material slurry composition was coated on a Cu current collector, dried and then compressed to prepare an anode.

Example 2

An anode was prepared by the same procedure in Example 1, except that an artificial graphite (Tradename: CP7M, Manufacturer: Shanshan Technology) at 70 wt % and natural graphite (Tradename: HC37, Manufacturer: Hitachi, Ltd.) at 30 wt % were mixed to prepare an anode active material.

Example 3

An anode was prepared by the same procedure in Example 1, except that an artificial graphite (Tradename: CP7M, Manufacturer: Shanshan Technology) at 60 wt % and natural graphite (Tradename: HC37, Manufacturer: Hitachi, Ltd.) at 40 wt % were mixed to prepare an anode active material.

Comparative Example 1

An anode was prepared by the same procedure in Example 1, except that only an artificial graphite (Tradename: CP7M, Manufacturer: Shanshan Technology) was used as an anode active material.

Comparative Example 2

An anode was prepared by the same procedure in Example 1, except that an artificial graphite (Tradename: CP7M, Manufacturer: Shanshan Technology) at 90 wt % and natural graphite (Tradename: HC37, Manufacturer: Hitachi, Ltd.) at 10 wt % were mixed to prepare an anode active material.

Comparative Example 3

An anode was prepared by the same procedure in Example 1, except that an artificial graphite (Tradename: CP7M, Manufacturer: Shanshan Technology) at 50 wt % and natural graphite (Tradename: HC37, Manufacturer: Hitachi, Ltd.) at 50 wt % were mixed to prepare an anode active material.

Comparative Example 4

An anode was prepared by the same procedure in Example 1, except that an artificial graphite (Tradename: CP7M, Manufacturer: Shanshan Technology) at 40 wt % and natural graphite (Tradename: HC37, Manufacturer: Hitachi, Ltd.) at 60 wt % to prepare an anode active material.

Comparative Example 5

An anode was prepared by the same procedure in Example 1, except that an artificial graphite (Tradename: CP7M, Manufacturer: Shanshan Technology) at 20 wt % and natural graphite (Tradename: HC37, Manufacturer: Hitachi, Ltd.) at 80 wt % were mixed to prepare an anode active material.

Comparative Example 6

An anode was prepared by the same procedure in Example 1, except that only natural graphite (Tradename: HC37, Manufacturer: Shanshan Technology) was used as an anode active material.

Comparative Example 7

An anode was prepared by the same procedure in Example 1, except that only natural graphite (Tradename: BSG-L, Manufacturer: BTR New Energy Technology Co., Ltd.) was used as an anode active material.

The interlayer spacing d(002) of the natural graphite was measured and the result was 3.357 Å.

Comparative Example 8

An anode was prepared by the same procedure in Example 1, except that an artificial graphite (Tradename: CP7M, Manufacturer: Shanshan Technology) at 80 wt % and natural graphite (Tradename: BSG-L, Manufacturer: BTR New Energy Technology Co., Ltd.) which was used in Comparative Example 7, at 20 wt % were mixed to prepare an anode active material.

Comparative Example 9

An anode was prepared by the same procedure in Example 1, except that an artificial graphite (Tradename: CP7M, Manufacturer: Shanshan Technology) at 70 wt % and natural graphite (Tradename: BSG-L, Manufacturer: BTR New Energy Technology Co., Ltd.) which was used in Comparative Example 7, at 30 wt % were mixed to prepare an anode active material.

Comparative Example 10

An anode was prepared by the same procedure in Example 1, except that an artificial graphite (Tradename: CP7M, Manufacturer: Shanshan Technology) at 60 wt % and natural graphite (Tradename: BSG-L, Manufacturer: BTR New Energy Technology Co., Ltd.) which was used in Comparative Example 7, at 40 wt % were mixed to prepare an anode active material.

Comparative Example 11

An anode was prepared by the same procedure in Example 1, except that an artificial graphite (Tradename: CP7M, Manufacturer: Shanshan Technology) at 40 wt % and natural graphite (Tradename: BSG-L, Manufacturer: BTR New Energy Technology Co., Ltd.) which was used in Comparative Example 7, at 60 wt % were mixed to prepare an anode active material.

Comparative Example 12

An anode was prepared by the same procedure in Example 1, except that an artificial graphite (Tradename: CP7M, Manufacturer: Shanshan Technology) at 20 wt % and natural graphite (Tradename: BSG-L, Manufacturer:

BTR New Energy Technology Co., Ltd.) which was used in Comparative Example 7, at 80 wt % were mixed to prepare an anode active material.

The anodes according to Examples 1 to 3 and Comparative Examples 1 to 12, a lithium metal counter electrode and an electrolyte were used to fabricate a half-cell. The electrolyte was used as a mixed solvent of ethylene carbonate and diethyl carbonate (50:50 volume ratio) in which 1.0M $LiPF_6$ was dissolved.

\* Measurement of XRD

The XRD for the anode active materials according Examples 1 to 3 and Comparative Examples 1 to 12 was measured using a CuKα ray as a target ray.

The XRD measurement was performed to an anode prepared by mixing 97.5 wt % of the anode active material, 1 wt % of a styrene-butadiene rubber binder, and 1.5 wt % of carboxymethyl cellulose in a water solvent to prepare a slurry, coating the slurry on a Cu foil, and vacuum-drying it.

Herein, the measurement condition was 2θ=40° to 50° and scan speed (°/S) of 0.0056, and scan step size of (0.0066°/step). The detailed measurement condition was shown in the Table 1.

TABLE 1

| | Empyrean (PANalytical) |
|---|---|
| X-ray tube | Cu source, 2.2 KWKα1 = 1.54056 Å, Kα2 = 1.54443 Å |
| Tube voltage/Ampere (default) | 40 kW × 40 mA |
| Detector | PIXcel$^{1D}$-Megipix3 |
| Incident optic | Bragg-Brentano HD |
| Goniometer radius | 240 mm |
| Divergence silt | ⅛° |
| Incident Soller slit | 0.02 rad |
| Incident anti-scattering slit | ½° |
| Diffracted Soller slit | 0.02 rad |
| Diffracted anti scattering slit | 8 mm |
| Scan mode(scan mode) | Theta-theta(reflection) |
| Scan speed | 0.0056°/s |
| Scan step size(°/step) | 0.0066°/step |
| Scan range | 40° to 50° |

Among the results of the measured XRD, the results of Examples 1 and 3 and Comparative Examples 1, and 4 to 6 are shown in Table 2, and the results of Comparative Examples 7, 8, 10, 11 and 12 are shown in Table 3. For reference, the result of Comparative Example 1 is also shown in Table 3.

TABLE 2

| | Amount of natural graphite (wt %) | $I_{3R(101)}/I_{2H(100)}$ |
|---|---|---|
| Comparative Example 1 | 0 | 0.43 |
| Example 1 | 20 | 0.55 |
| Example 3 | 40 | 0.65 |
| Comparative Example 2 | 10 | 0.06 |
| Comparative Example 3 | 50 | 0.3 |
| Comparative Example 4 | 60 | 0.78 |
| Comparative Example 5 | 80 | 0.9 |
| Comparative Example 6 | 100 | 1.01 |

TABLE 3

| | Amount of natural graphite (wt %) | $I_{3R(101)}/I_{2H(100)}$ |
|---|---|---|
| Comparative Example 1 | 0 | 0.43 |
| Comparative Example 8 | 20 | 0.43 |
| Comparative Example 9 | 30 | 0.44 |
| Comparative Example 10 | 40 | 0.44 |
| Comparative Example 11 | 60 | 0.44 |
| Comparative Example 12 | 80 | 0.46 |
| Comparative Example 7 | 100 | 0.46 |

As shown in Table 2, Examples 1 and 3 in which natural graphite having the interlayer spacing d(002) of 3.359 Å were included in an amount of 20 wt % to 40 wt % had a ratio of $I_{3R(101)}/I_{2H(100)}$ within in the range of 0.5 to 0.7.

Otherwise, as shown in Table 3, Comparative Examples 7, 8, 10, 11, and 12 including natural graphite at an amount of 20 wt % to 40 wt %, in which the interlayer spacing d(002) of the natural graphite was 3.357 Å, had a ratio of $I_{3R(101)}/I_{2H(100)}$ of less than 0.5.

\* Evaluation of Charge and Discharge Rates, and Initial Efficiency

The half-cells using the anodes according to Examples 1 to 3, and Comparative Example 1 to 12 were 0.1 C charged once and 0.1 C discharged once under the constant current/constant voltage condition and discharge capacity and charge capacity were measured.

Furthermore, the half-cells underwent a 0.2 C charge and discharge under the constant current/constant voltage condition once, and underwent a 2.0 C charge and discharge under the constant current/constant voltage condition once, and a ratio of the charge capacity at the 2.0 C constant current to the charge capacity at the 0.2 C constant current were measured. Among these results, the discharge capacity (♦) and the ratio of charge capacity (referred to as charge rate characteristics, ■) of Examples 1 and 2, and Comparative Examples 1, 2, 3, and 6 are shown in FIG. 2.

In addition, the half-cells using anodes according to Examples 1 to 3, and Comparative Examples 1 to 12 were charged once at 3.0 C and discharged once at 0.2, and the discharge capacity and the discharge rate characteristics were measured. Among these results, the results of Examples 1 and 2 and Comparative Example 1, 2, 3, and 6 are shown in FIG. 3 (discharge capacity (♦) and discharge rate characteristic (■)).

Figure 2:
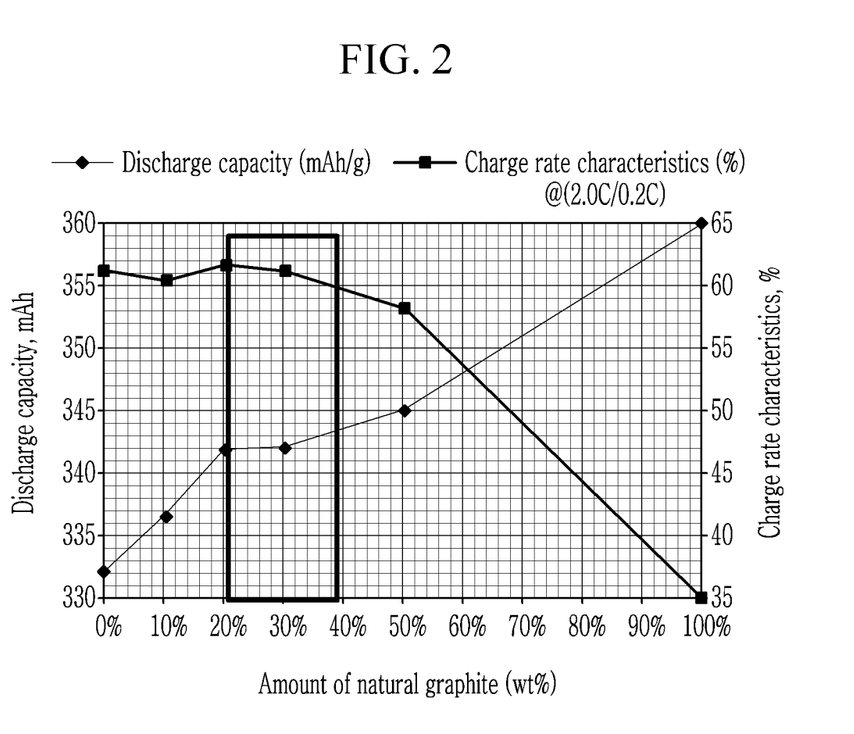
FIG. 2 is a graph showing discharge capacity and charge rate characteristics of half-cells using anodes according to Examples 1 and 2 and Comparative Examples 1, 2, 3, and 6.
Figure 3:
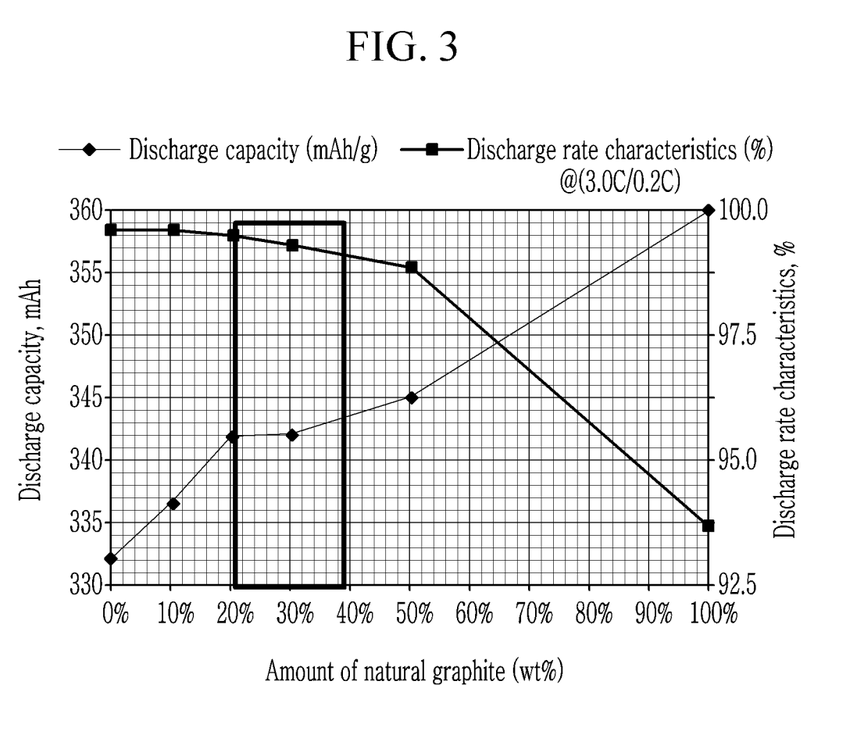
FIG. 3 is a graph showing discharge capacity and discharge rate characteristics of half-cells using anodes according to Examples 1 and 2 and Comparative Example 1, 2, 3, and 6.

As shown in FIG. 2 and FIG. 3, Examples 1 and 2 using natural graphite and artificial graphite at a weight ratio of 20:80 and 30:70, respectively, exhibited desired discharge capacity and excellent charge rate and discharge rate characteristics. Meanwhile, Comparative Example 1 using only artificial graphite or Comparative Example 2 using a small amount of natural graphite exhibited extreme low discharge capacity, and Comparative Example 3 using large amount of natural graphite and Comparative Example 6 using only natural graphite exhibited good discharge capacity, but exhibited significantly deteriorated charge rate and discharge rate characteristics. As such, it can be seen that Examples 1 and 2 exhibited better charge rate characteristics than Comparative Examples 1, 2, 3, and 6, so that the active materials had low resistance.

Figure 4:
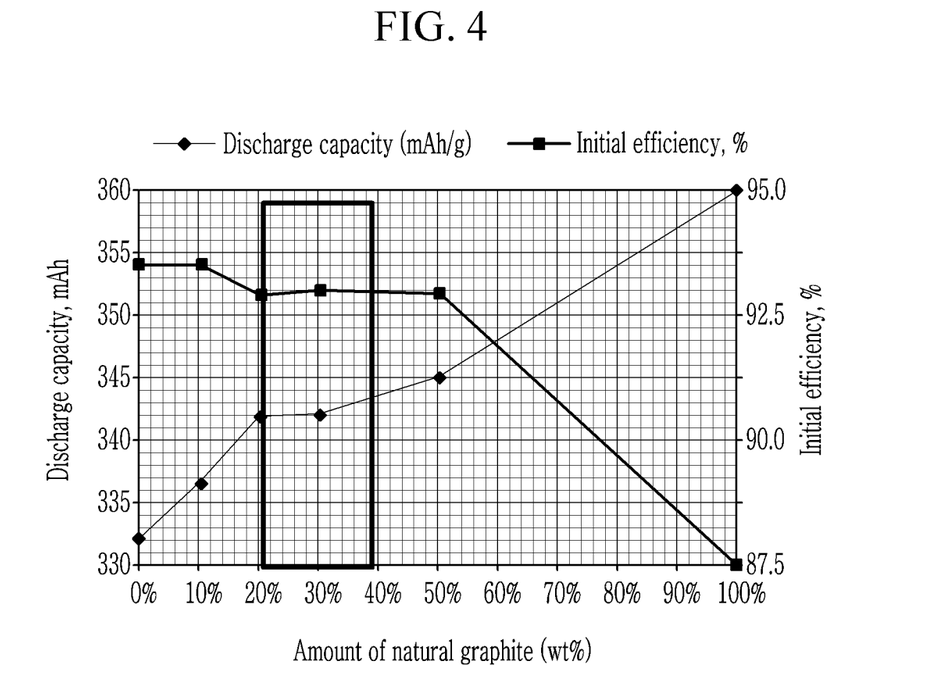
FIG. 4 is a graph showing discharge capacity and initial efficiency of half-cells using anodes according to Examples 1 and 2 and Comparative Example 1, 2, 3, and 6.

Furthermore, the half cells using anodes according to Examples 1 to 3, and Comparative Example 1 to 11 were charged once and discharged once at 0.1 C charge and 0.1 C discharge, the charge and discharge capacity were measured, and then the initial efficiency (percentage value of discharge capacity/charge capacity) was obtained. Among these results, the results according to Example 1 and 2, and Comparative Example 1, 2, 3, and 6 are shown in FIG. 4, and the discharge capacity is also shown in FIG. 4 (discharge capacity (♦) and initial efficiency characteristic (■)). From FIG. 4, it can be seen that Examples 1 and 2 using natural graphite and artificial graphite at a weight ratio of 20:80 and 30:70 exhibited suitable discharge capacity and excellent initial efficiency. Otherwise, Comparative Example 1 using only artificial graphite or Comparative Example 2 using a small amount of natural graphite exhibited very low discharge capacity, and Comparative Example 3 using a large amount of natural graphite and Comparative Example 6 using only natural graphite exhibited good discharge capacity, but exhibited significantly deteriorated initial efficiency.

* Measurement of DC Internal Resistance (DC-IR: Direct Current Internal Resistance)

The half-cells using anodes according to Examples 1 to 3, and Comparative Example 1 to 11 were charged once and discharged once at a 3.0 C charged and a 0.2 C discharged at −10° C., a voltage drop of which a voltage difference between a voltage (V) occurring by flowing a current at 3 C for 10 seconds and voltage (V) occurring by flowing a current at 0.2 C for 10 seconds measured under the SOC50 (charge to 50% of charge capacity based on 100% of entire battery charge capacity) to obtain DC internal resistance (DC-IR). Among these results, the results of Comparative Example 1 (amount of natural graphite being 0 wt %), Comparative Example 2 (amount of natural graphite being 10 wt %), Example 2 (amount of natural graphite being 30 wt %), Comparative Example 3 (amount of natural graphite being 50 wt %), and Comparative Example 6 (amount of natural graphite being 100 wt %) are shown in FIG. 5.

Figure 5:
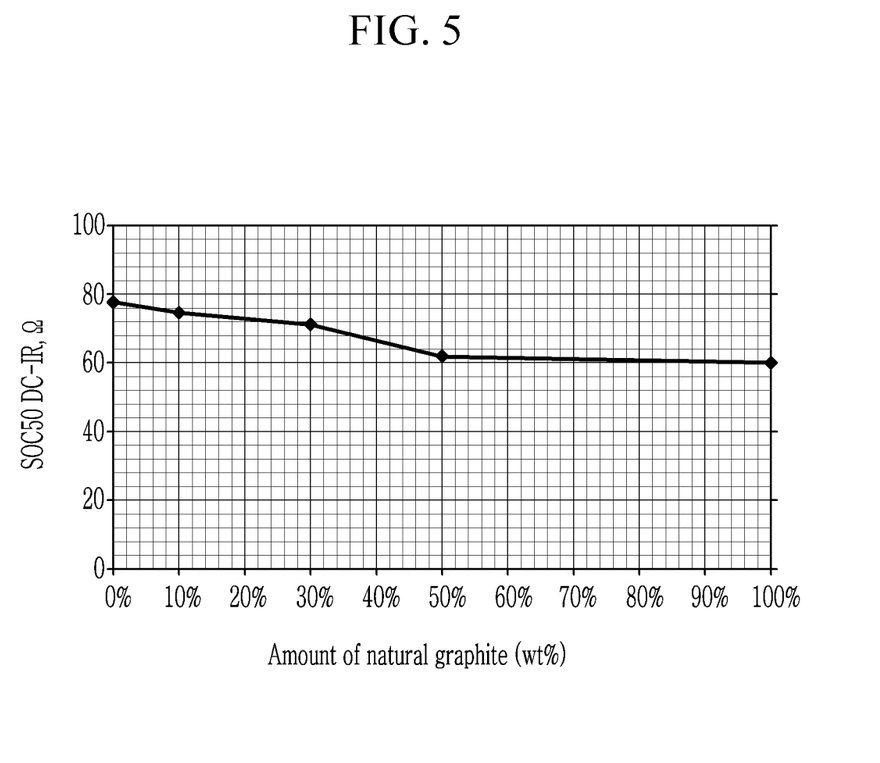
FIG. 5 is a graph showing discharge capacity and low-temperature DC internal resistance of half-cells using anodes according to Examples 1 and 2 and Comparative Example 1, 2, 3, and 6.

As shown in FIG. 5, the half-cells using anodes according to Example 2, and Comparative Example 3 and 6 exhibited suitable DC internal resistance, but the half-cells using anodes according to Comparative Examples 1 and 2 exhibited very high DC internal resistance. From these results, it can be seen that if when including natural graphite at an amount of 20 wt % to 40 wt %, they exhibited similarly suitable DC internal resistance to one using only natural graphite (Comparative Example 6) and one using natural graphite and artificial graphite at the same amount (Comparative Example 3).

The results shown in FIG. 2 to FIG. 4 are abbreviated in Table 4. In addition, the results of Comparative Example 7 and 9 among these results are also shown in Table 4.

From the results of Table 4, it can be seen that Examples 1 and 2 exhibited better discharge capacity, and charge rate characteristics, while Comparative Example 1 using only artificial graphite, and Comparative Example 2, 3 and 9 using natural graphite at 10 wt %, 50 wt % and 30 wt %, respectively, in which the peak intensity of $I_{3R(101)}/I_{2H(100)}$ is out of 0.55 to 0.7, exhibited deteriorated discharge capacity, and charge rate characteristics.

Furthermore, Comparative Example 6 and 7 only using natural graphite exhibited good discharge capacity, but had deteriorated charge rate and discharge rate characteristics.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

The invention claimed is:

1. An anode active material for a lithium secondary battery comprising a first graphite and a second graphite, and having a ratio $(I_{3R(101)}/I_{2H(100)})$ of peak intensity at a 3R(101) face relative to a peak intensity at a 2H(100) face ranging from 0.55 to 0.7, in an X-ray diffraction pattern,
wherein the first graphite has an interlayer spacing d(002) of 3.354 Å≤d(002)≤3.359 Å.

2. The anode active material for a lithium secondary battery of claim 1, wherein the first graphite is natural graphite and the second graphite is artificial graphite.

3. The anode active material for a lithium secondary battery of claim 1, wherein the first graphite and the second graphite have a mixing ratio of 20:80 to 40:60 by weight.

4. The anode active material for a lithium secondary battery of claim 2, wherein the second graphite has an interlayer spacing, d(002) of 3.360 Å<d(002)<3.364 Å.

5. The anode active material for a lithium secondary battery of claim 1, wherein the ratio $(I_{3R(101)}/I_{2H(100)})$ of peak intensity at a 3R(101) plane relative to a peak intensity at a 2H(100) plane is 0.55 to 0.65.

6. The anode active material for a lithium secondary battery of claim 1, wherein the ratio $(I_{3R(101)}/I_{2H(100)})$ of peak intensity at a 3R(101) plane relative to a peak intensity at a 2H(100) plane is more than 0.55 and 0.65 or less.

TABLE 4

|  | Amount of natural graphite natural (wt %) | Discharge capacity (mAh/g) (mAh/g) | Room temperature characteristic | | | Low temperature characteristic (−10° C.) SOC50 DC-IR (Ω) |
| --- | --- | --- | --- | --- | --- | --- |
|  |  |  | Initial efficiency (%) | Charge rate characteristic (%) (2.0 C/0.2 C) | Discharge rate characteristic (%) (3.0 C/0.2 C) |  |
| Comparative Example 1 | 0 | 332.2 | 92.3 | 61.2 | 99.6 | 78 |
| Comparative Example 6 | 100 | 359.9 | 87.5 | 35.0 | 93.7 | — |
| Comparative Example 7 | 100 | 360 | 91.7 | 35.9 | 96.5 | — |
| Comparative Example 2 | 10 | 336.6 | 92.3 | 60.5 | 99.6 | 75 |
| Example 1 | 20 | 341.9 | 91.7 | 61.7 | 99.5 | — |
| Example 2 | 30 | 342.1 | 91.8 | 61.2 | 99.3 | 71 |
| Comparative Example 3 | 50 | 345.0 | 91.7 | 58.3 | 98.9 | 62 |
| Comparative Example 9 | 30 | 338 | 94.3 | 50.0 | 99.0 | — |

7. A lithium secondary battery comprising:
an anode comprising an anode active material claim 1;
a cathode comprising a cathode active material; and
an electrolyte.

* * * * *